July 15, 1952 — E. A. NETZBAND — 2,603,499

VEHICLE FOR THE DISTRIBUTION OF NEWSPAPERS OR THE LIKE

Filed Sept. 26, 1949 — 2 SHEETS—SHEET 1

INVENTOR.
EARL A. NETZBAND
BY John W. Michael
ATTORNEY

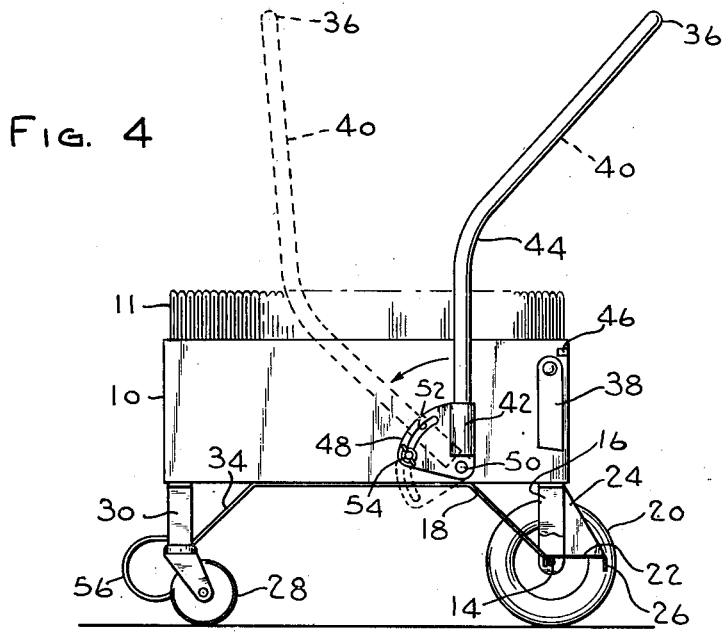
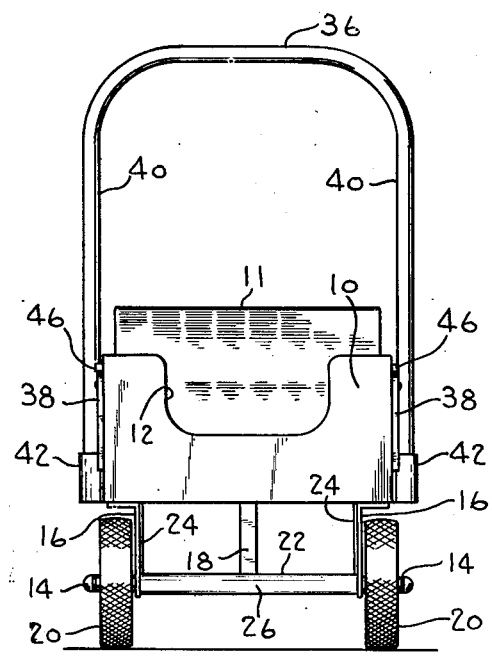
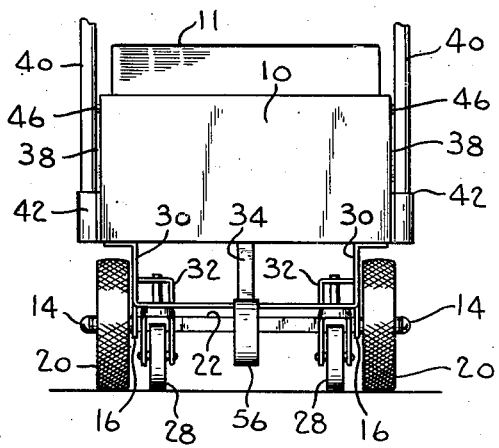

Patented July 15, 1952

2,603,499

UNITED STATES PATENT OFFICE 2,603,499

VEHICLE FOR THE DISTRIBUTION OF NEWSPAPERS OR THE LIKE

Earl A. Netzband, Milwaukee, Wis., assignor to Geuder, Paeschke & Frey Co., Milwaukee, Wis., a corporation of Wisconsin Application September 26, 1949, Serial No. 117,897

3 Claims. (Cl. 280—7.17)

This invention relates to improvements in vehicles particularly to the type adapted for the distribution of newspapers and the like.

Vehicles adapted for this usage must be easily loaded and unloaded and readily controlled and propelled at both high and low speeds. The object of this invention is to provide a vehicle having such characteristics.

To facilitate loading the cart, the body is related to the rear axle so that it may be tilted thereabout to assume a substantially vertical position. In this position newspapers or the like may be stacked in the body in substantially horizontal layers. When the body is swung back to horizontal position, the papers will be on edge and each paper or unit will be readily available for withdrawal. To hold the body in such vertical position, the handle, while in hand-pushing position, contacts the ground to provide a second support cooperating with the rear wheels in keeping the body so positioned. If the handle is in occupant-propelled position, then adjustable supports are moved to ground-contacting position to provide such second support.

The cart is convertible from hand pushed to occupant propelled by making the handle adjustable from a position outside the confines of the body, where it may be conveniently grasped to push and steer the vehicle, to a steady rest position over the central part of the body where it provides a support for the occupant who stands with one foot on a platform and intermittently pushes the ground with the other foot. The cart may thus be pushed and easily maneuvered at a relatively slow speed when careful maneuvering is required, or propelled by a riding occupant at a relatively higher speed when careful maneuvering is not required.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 4 is a view in side elevation of a modification of the invention;

Fig. 5 is a view in rear end elevation taken from line 5—5 of Fig. 1; and

Fig. 6 is a fragmentary view in front end elevation taken from line 6—6 of Fig. 1.

Figure 1:
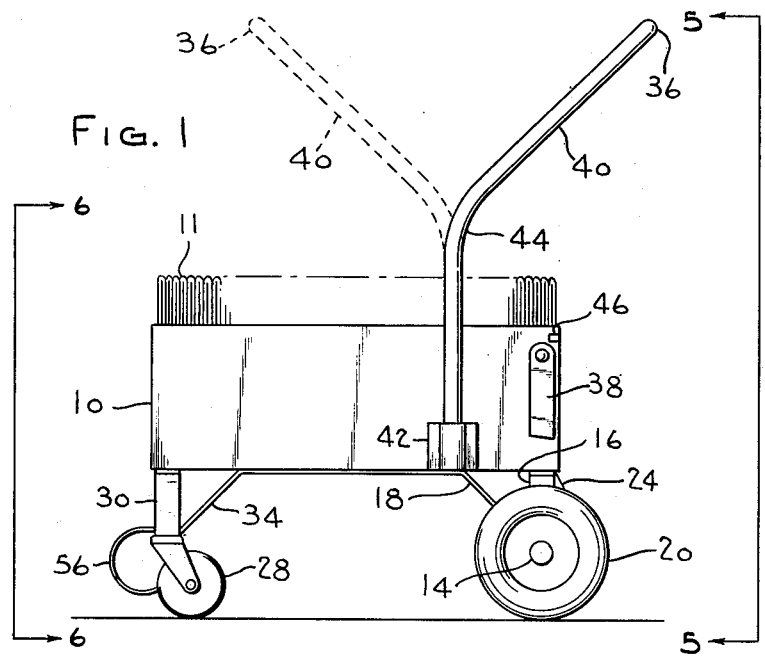
Fig. 1 is a view in side elevation of a vehicle embodying the present invention, the handle for said vehicle being shown in full in the hand-pushed position and in dotted line in the alternate occupant-propelled position.

Referring to the drawings by reference numerals, the vehicle described herein is particularly adapted for use by newsboys in distributing newspapers in crowded urban areas. They propel the vehicle rapidly along the sidewalks until a distribution area is reached. Thereafter the vehicle is moved slowly from door to door, into and out of apartment buildings, corridors, and elevators. The vehicle, however, may be also used in the transportation of other articles, particularly articles which are more conveniently selected and withdrawn when stacked on edge and more readily loaded into the body of the cart by stacking such material in horizontal layers.

The cart consists of an open top rectangularly shaped box-like body 10, the sides of which are of less height than sheets of material to be stacked on edge therein. In this particular embodiment, the sheets of material 11 stacked on edge are newspapers. The rear wall of body 10 may be cut away as indicated at 12 (Fig. 5) to provide clearance space for the shins of an occupant riding on the step of the vehicle in the manner hereinafter described. At the rear end of body 10 there is a rear axle 14 mounted in the legs of a bracket 16 secured to the bottom of such body. A brace 18 angularly extending from body 10 to axle 14 provides rigidity for the axle. There is mounted on axle 14 a pair of rubber-tired wheels 20 and body 10 may be pivoted about such axle from the horizontal carrying position shown in Fig. 1 to the substantially vertical loading position shown in Fig. 2. A platform 22 (see Fig. 4) secured to axle 14 has sides 24 secured to the legs of bracket 16 to make platform 22 more secure. If desired, platform 22 may be provided with a downturned stiffening flange 26. The front end of the body 10 is supported on a pair of casters 28 mounted in a caster bracket 30 secured to body 10. A pair of angles 32 fastened to the bracket 30 provide the necessary support for the vertical stem of the casters. Bracket 30 is further supported and strengthened by a brace 34 extending from the bracket 30 to the bottom of body 10. The casters 28 and rear wheels 20 cooperate to dirigibly support body 10 in a horizontal position. So supported the cart may be guided and steered along desired paths, the casters 28 permitting the forward end to be swung in a circular path to accomplish steering and turning in close quarters.

Figure 2:
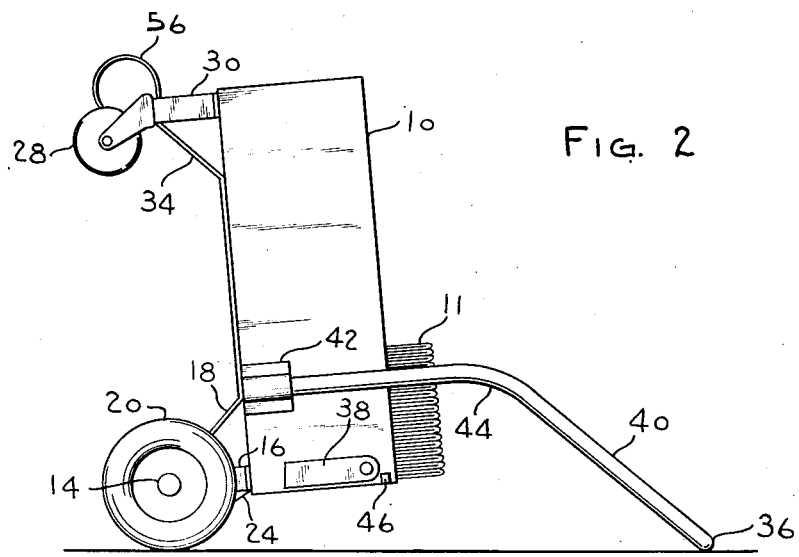
Fig. 2 is a view in side elevation of the vehicle of Fig. 1 tilted to substantially vertical loading position.
Figure 3:
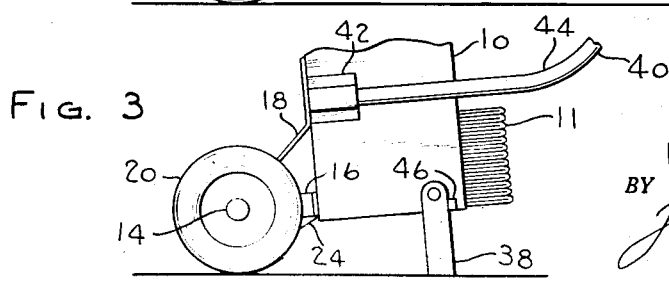
Fig. 3 is a fragmentary view in side elevation of the vehicle viewed in Fig. 2 while held on supports with the handle in occupant-propelled position.

Sheets of newspapers and other such material may be more readily loaded if stacked in horizontal layers. To accomplish this, body 10 is held in a substantially vertical position during the loading. Axle 14 is used as a fulcrum about which body 10 is swung into the substantially vertical position shown in Fig. 2, the handle 36 providing the necessary lever arm. As shown in Fig. 2, the handle 36 may rest on the ground and thus cooperate with the rear wheels 20 to hold body 10 in such vertical position or, as shown in Fig. 3, pivoted legs 38 may be swung into ground contact and used instead of such handle. These legs are of a length to cooperate with wheels 20 to hold the body in such vertical position. Stops 46 fastened to the sides of body 10 locate legs 38 in the proper position as they are swung out from the body.

The cart is either hand pushed for slow and careful maneuvering or occupant propelled for faster transportation. In the first instance handle 36 must be located behind the cart and in the second instance it must be located above the central portion of the cart. One way to accomplish this is by shifting the handle about a vertical axis. The handle 36 has legs 40 the lower ends of which slidably fit into sockets 42 fastened to opposite sides of body 10 at the position shown in the drawings. The legs may be withdrawn from the sockets and handle 36 rotated about a vertical axis through 180° and the legs then refitted within sockets 42. By providing legs 40 with a substantially 45° bend, as indicated at 44, handle 36 will, in one position thereof, be spaced laterally outwardly or to the rear of the body 10, and, in the other position thereof, be over the central part of the body as shown in the dotted lines of Fig. 1. The full line position is termed the hand push position and the dotted line position is termed the steady rest or occupant-propelled position. The occupant stands with one foot on platform 22, engages the handle with his hands so that his body is bent forward, and intermittently engages the ground with the other foot to propel the cart at a relatively higher speed.

The handle 36 may also be shifted by mounting the sockets 42 so that they pivot with respect to body 10. This modification is illustrated in Fig. 4. In such case, each socket 42 is mounted on a sector-like member 48 which is pivoted at 50 to the sides of body 10. The sector is provided with an arcuate slot 52 which slidably receives a bolt and wing nut 54 secured to the side of body 10. The length of slot 52 is sufficient to permit sector 48 to be swung so that sockets 42 move from the substantially vertical position shown in the full lines of Fig. 4 to the inclined position shown in the dotted lines of that figure. The segment may be locked in either of these two extremes by tightening the bolt and wing nut 54.

In order to protect casters 28 from striking against curbs and other like obstructions, as the cart is propelled along city streets and sidewalks, a circular-shaped bumper 56 is carried on bracket 30 so that it projects beyond the front of body 10 and casters 28. The lowest portion of bumper 56 is spaced above the ground at such a height that such bumper will clear curbs or the like which would not harmfully interrupt the progress of casters 28. If it strikes curbs which are not quite as high as the middle part of the bumper 56, the lower curve thereof will automatically raise the front end of the car, thus bringing the casters up to easy engagement therewith. When the bumper engages higher obstacles, it will then be necessary to manually lift the front end of the cart.

Although only two embodiments of the invention are shown and described herein, it will be understood that this application is intended to cover such other changes or modifications as come within the spirit of the invention or scope of the following claims.

I claim:

1. A cart adapted for carrying newspapers or the like comprising a box-like body, an axle for supporting one end of said body and having a pair of wheels mounted thereon, a caster supporting the other end of said body and cooperating with said wheels to provide a wheeled support for said body permitting the steering thereof, handle sockets pivoted to opposite sides of said body spaced substantially forwardly of said axle, means for clamping said sockets in selected angular positions, said means including a slot for limiting the extreme positions of said sockets, a handle for said cart having legs carried by said sockets, said handle in one extreme position of said sockets being spaced laterally outwardly of said body to adapt said cart for hand pushing, said handle in another extreme position of said socket being positioned over the central part of said body to provide a steady rest for the occupant propelling of said cart and a platform adjacent one end of said body whereby an occupant may stand with one foot on said platform with his hands on said steady rest and intermittently push the ground with the other foot to propel said cart.

2. A cart for carrying newspapers or the like comprising a body portion adapted to hold newspapers or the like on edge, means for movably supporting said body, a pair of handle sockets on opposite sides of said body, a handle for said cart having legs adapted to be alternatively inserted in said sockets, said legs being bent so that in one alternative position thereof said handle will be spaced rearwardly of said body to provide means for hand-pushing said cart, said handle when rotated about a vertical axis through 180° and said legs inserted in said brackets in the other alternative position thereof being positioned over the central portion of said body to provide a steady rest, and a platform adjacent one end of said body whereby an occupant may stand with one foot on said platform with his hands on said steady rest and intermittently push the ground with the other foot to propel said cart.

3. A cart as claimed in claim 2 in which the end of said body adjacent said platform is cut away to provide clearance space for the shins of the occupant standing on said platform.

EARL A. NETZBAND.

REFERENCES CITED

The following references are of record in the file of this patent:

UNITED STATES PATENTS

| Number | Name | Date |
| --- | --- | --- |
| 1,302,343 | Farrer | Apr. 29, 1919 |
| 1,678,836 | Wessborg | July 31, 1928 |
| 2,319,589 | Drinkwater | May 18, 1943 |
| 2,415,146 | Nanna | Feb. 4, 1947 |
| 2,428,935 | Hansburg | Oct. 14, 1947 |
| 2,433,069 | Siebert | Dec. 23, 1947 |
| 2,472,491 | Quinton | June 7, 1949 |